Sept. 2, 1958 — B. GORDON — 2,850,306
CHIN BAR CONNECTION

Filed Nov. 30, 1955 — 2 Sheets-Sheet 1

INVENTOR
BENJAMIN GORDON

BY
ATTORNEYS

Sept. 2, 1958     B. GORDON     2,850,306
CHIN BAR CONNECTION

Filed Nov. 30, 1955     2 Sheets-Sheet 2

INVENTOR
BENJAMIN GORDON
BY
ATTORNEYS

2,850,306
CHIN BAR CONNECTION
Benjamin Gordon, Philadelphia, Pa.
Application November 30, 1955, Serial No. 550,121
4 Claims. (Cl. 287—54)

The present invention relates to playground apparatus and more particularly to joining means utilizable for the framework of such apparatus.

Heretofore it has been the practice to use bolts, rivets, or other hardware to detachably or otherwise fasten together the legs, bracings and related elements of the framework of playground apparatus. The joints of the frame formed in this manner have required considerable time for assembly and disassembly, while in the case of non-detachable joints, the frames utilizing the same have been difficult and cumbersome to store. Although quick-connecting joints are well-known, such joints, before the present invention, have required a comparatively large number of die-stamped parts. Such parts are expensive to manufacture and to maintain in a state of repair, particularly with reference to maintaining their quick-detachable feature. Moreover, such parts have been usually constructed of sheet or other flat material, thereby requiring additional reenforcing members to furnish the same factor of strength found in the piping or tubular components commonly utilized in the framework of playground apparatus and thus not used for such apparatus.

Accordingly, an object of the instant invention is the provision of an efficient and inexpensive joining means for the framework of playground apparatus.

Another object of the invention is the provision of a quick-connecting joint for use in playground apparatus, requiring a minimum of parts.

Still another object of the invention is the provision of joining means for playground apparatus, which means is fabricated entirely from piping or tubular materials.

It is a still further object of the invention to provide joining means in a playground apparatus, formed integrally with the legs, bracings, or other related components of the framework of such apparatus.

Figure 1:
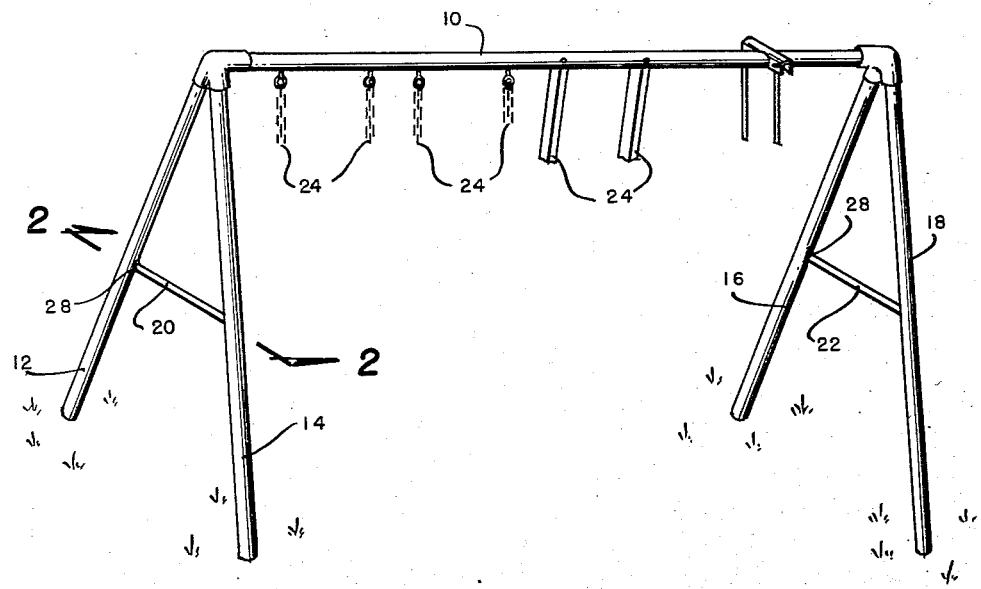

Additional objects and advantages of the invention will become apparent from a consideration of the forthcoming description of exemplary form of the invention, said description to be taken in conjunction with the accompanying drawings wherein:

Fig. 1 is a perspective view of one form of playground apparatus constructed in accordance with the principles of this invention.

Figure 2:
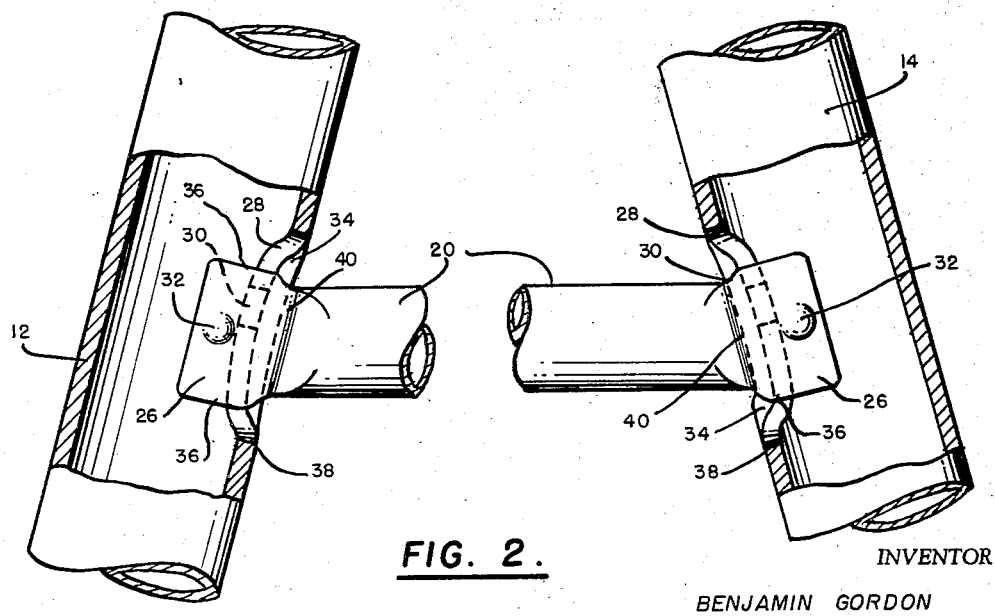
Figure 3:
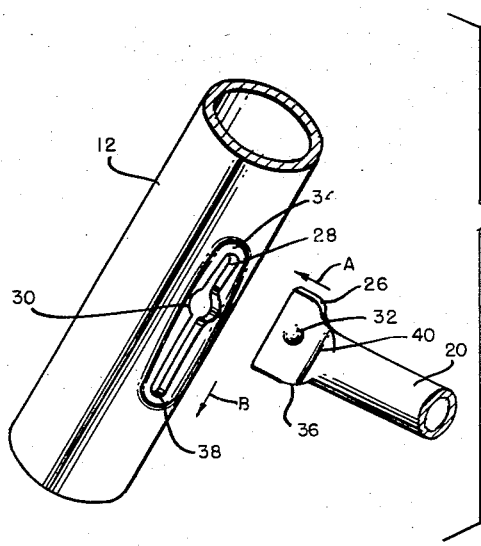
Figure 4:
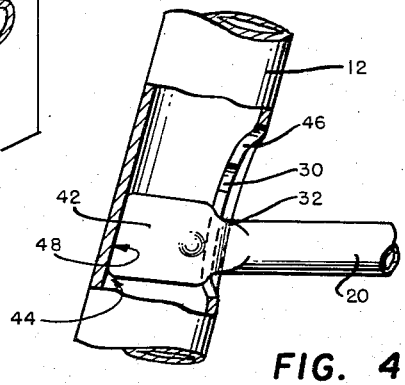
Figure 5:
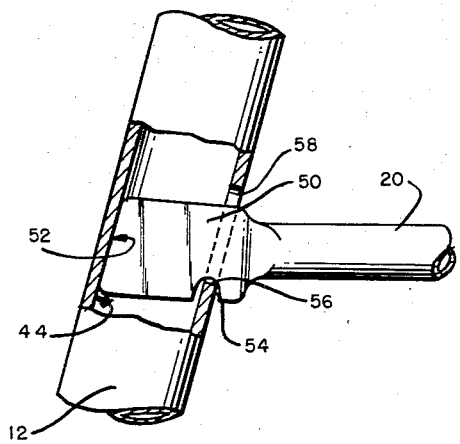
Figure 6:
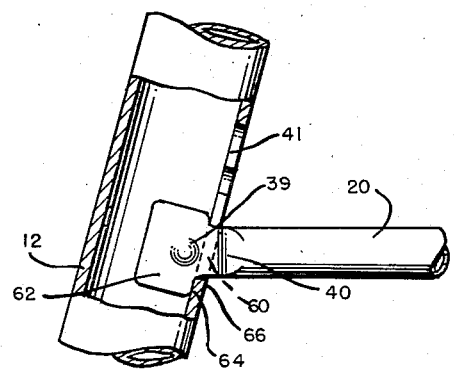

Fig. 2 is an enlarged fragmentary elevational view, partly in section, of the apparatus of Fig. 1, Fig. 3 is an enlarged exploded partial view of one of the joints of Fig. 1, Fig. 4 is a fragmentary sectional view of another form of the joining means constructed in accordance with the principles of this invention, Fig. 5 is a fragmentary sectional view of still another form of the joining means constructed according to the principles of the invention, and Fig. 6 is a fragmentary sectional view of yet another form of the joining means constructed in accordance with the teachings of the instant invention.

Referring now more particularly to Figs. 1–3 of the drawings, the exemplary form of the playground apparatus illustrated therein comprises a crossbar 10 supported at its extremities by a first pair of legs 12 and 14 and a second pair of legs 16 and 18. Each of the aforesaid pairs of supporting legs are maintained in their proper spatial relationship by means of the crossbraces 20 and 22, respectively, which are often referred to as chin bars. The crossbar 10 is provided with a plurality of hooks and other supporting means indicated generally by the reference character 24, for suspending the component elements, such as swings, teeter-totters, sliding boards, and the like, of the playground apparatus.

Each of the chin bars 20 and 22 are assembled to the respective legs 12 and 14, 16 and 18 by means of quick-connecting joints, the elements of each of such joints being formed integrally with the component parts of the framework of the playground apparatus. As will hereinafter be made more apparent, such joints are inexpensive, reliable and readily assembled and disassembled.

One exemplary form of the aforesaid quick-connecting (and also quick-detaching) joint includes a flattened portion 26 formed at the extremities of the tubular chin bar (crossbrace) 20 or 22 and a cooperating slot 28 formed in each of the supporting legs 12, 14, 16 and 18, one of such joints being shown in detail in Fig. 3. Each of the slots 28 is provided with a widened portion 30 adapted to receive a protuberance or raised part 32 formed on at least one surface of the flattened portion 26. Obviously protuberance 32 and the complementary portion 30 of slot 28 may be of any other suitable shape than that shown. The remainder of each slot 28 is of sufficient width to provide clearance for the flattened portion 26, exclusive of the protuberance 32. For preventing radial or angular movement of crossbrace 20 relative to the leg 12 and for further stabilizing the framework of the playground apparatus, slot 28 is formed in the tubular leg 12, as better illustrated in Fig. 2, such that a lip or depression 34 surrounds the slot 28, the walls of which depression 34 lie adjacent the edges of slot 28. Upon the insertion of crossbrace 20 into leg 12, in the manner presently to be described, the flattened portion 26 is detachably secured in slot 28 by the shoulder 36 and the protuberance 32 bearing against the lower extremity 38 and the inside edges, respectively, of slot 28 and by the tapered parts 40 of the tubular crossbrace 20 bearing against the walls of the depression 34. It will be appreciated that the bearing contact between the tapered parts 40, lying adjacent each face of the flattened portions 26, and the walls of the depression 34 prevent radial and angular distortion of crossbrace 20 relative to leg 12. When the crossbrace 20 and the associated legs 12 and 14 are thus in the joined position, outward movement of the crossbrace 20 or 22 relative to the associated legs is prevented by the raised part 32 bearing against the inside edges of the slot 28 and by a shoulder 36 of the flattened portion 26, which shoulder bears against the extremity 38 of slot 28, in the joined position of the aforesaid leg and crossbrace. Inward movement of the crossbrace 20 or 22 relative to the associated legs is prevented by the tapered parts 40 of the tubular crossbrace bearing against the suitably inclined walls of the depression 34. In order to preserve the desired angularity of the crossbrace 20 relative to the leg 12 in the joined position the flattened portion 26 is desirably formed at an angle to the crossbrace 20, as clearly shown in Fig. 2.

The legs 12 and 14 normally extend at an angle as is shown in Figure 1. The protuberance at one end of the chin bar 32 is inserted through slot 30 and moves downwardly along the inner edge of a side wall defining the slot 28 and the depression 34. The opposite end of the chin bar is then similarly inserted into the opposing or facing leg. With the legs in the position illustrated in Figure 2 it is seen that the inner edges of the side walls defining the slot and the depression 34 on one leg are angled with respect to the corresponding elements on the opposite leg, and taper outwardly with respect to each other. Thus the protuberances 32 must move outwardly with respect to each other as the chin bars move downwardly in the slots. This results in tension being placed on the chin bars and compression on the walls forming the slot members. A snug rigid association of the elements is thus insured.

Alternatively, as shown in Fig. 4, the aforesaid inward movement can be prevented by providing a flattened portion 42 having sufficient length to contact the inner wall 44 of leg 12 when inserted in the slot 46 formed in leg 12 and which additionally serves to prevent radial movement of crossbrace 20 relative to leg 12. The edge 48 of the flattened end portion 42 is angled or inclined such that the desired angular disposition of crossbrace 20 relative to leg 12 is maintained. It will be appreciated that the form of the joint shown in Fig. 4 is assembled in the same manner as that presently to be described in connection with Fig. 3.

In operation, referring more particularly to Fig. 3, a flattened end portion 26 of the crossbrace 20 is inserted, in the direction indicated by arrow A, into the slot 28 of the associated supporting leg 12, such that the protuberance or raised part 32 passes through the widened portion 30 provided for that purpose in slot 28. When thus inserted, the crossbrace 20 is moved downwardly relative to leg 12, that it is to say in the direction indicated by arrow B. The crossbrace is then in operating position but is easily and quickly removed by a reversal of the aforedescribed manner of assembly.

Another exemplary form of joining means constructed in accordance with the principles of the present invention and illustrated in Fig. 5, includes the flattened end portion 50 formed at an extremity of the crossbrace 20 and having an inclined edge 52 adapted to bear against the inner wall 44 of leg 12 in the proper angular and radial disposition of crossbrace 20 relative to leg 12, as aforesaid in connection with Fig. 4. To prevent outward movement of the crossbrace 20 relative to leg 12, a notch or indent 54 is provided in the flattened end portion 50 and is adapted to cooperate with the lower extremity 56 (Fig. 3) of slot 58. The form of joining means illustrated in Fig. 5 is assembled in the manner described heretofore in connection with Fig. 3, with the exception that protuberance 32 and the complementarily widened portion 30 are desirably eliminated.

In the event that a less sturdy joint than that shown in Figs. 1–5 is desired, the depression 34 of Figs. 1–3 surrounding slot 28 can be eliminated as shown in Fig. 6. Inward and outward movement of crossbrace 20 relative to leg 12 is prevented by the protuberance 39 and the tapered portion 40 bearing against the inner and outer edges, respectively, of slot 41. In this arrangement it is desirable to taper the lower portion 60 of slot 41 inwardly to frictionally lock the flattened portion 62 in the proper position in slot 41. A shoulder 64 is desirably provided on the flattened portion 62 and is adapted to bear against the wall of leg 12 adjacent the lower extremity 66 of slot 41.

Although the invention has been described in connection with the framework of playground apparatus, it will be appreciated that the novel joining means provided by this invention can be utilized with other types of frames employing tubular components. Furthermore, it is obvious that a greater or lesser number of joining means and associated supporting members than that shown and described herein can be utilized for such frames.

In addition to the exemplary forms of the invention herein illustrated and described, other arrangements and embodiments thereof will occur to those skilled in the art without departing from the spirit and scope of the invention, as defined in the appended claims. Moreover, it is to be understood that certain features of the invention can be utilized without a corresponding use of other features.

I claim:

1. In combination, a pair of tubular elements extending in a common plane at an angle to each other, each of said tubular elements having an elongated depression extending laterally thereof, a slot positioned at the base of said depression and extending laterally of said leg, said slot having an enlarged portion positioned above the base thereof, said tubular members being hollow with the inner walls of said tubular members conforming to said depression and the exterior thereof, the depression and slot of one of said elements facing the depression and slot of the other of said elements, means for joining said legs comprising a tubular connecting member, said tubular connecting member having a flattened end and a protuberance formed in said flattened end extending at right angles to the plane of said flattened end, said protuberance being formed complementary to said enlarged portion of one of said slots and being movable therethrough together with said flattened portion, said tubular connecting member having a second flattened portion at its opposite end and a second protuberance formed thereon and extending laterally of said second flattened portion, said second protuberance being movable together with said second flattened portion through the other of said slots when said second protuberance is aligned with the enlarged portion of said other of said slots, the distance between said protuberances being equal to the distance between the said inner walls of said tubular elements at said enlarged portions of said slots but being less than the distance between the said inner walls of said tubular members below said enlarged portions, said connecting tubular member being movable downwardly with said protuberances, respectively, being inwardly of said inner walls at said enlarged portions and bearing against said inner walls below said enlarged portions in frictional engagement with said walls.

2. The apparatus of claim 1 in which the flattened portions of said ends of said connecting member are formed of a thickness complementary to the width of said slots and bear against said walls of said elements at said slots when in fixed position with said protuberances below said enlarged portions.

3. The apparatus of claim 1 in which the tubular portion of said member merges into said flattened portions by means of tapered portions formed complementary to the walls forming said depression and bear against the sides thereof when said member is in a fixed position with respect to said elements.

4. In a playground device, tubular legs for supporting said device, said legs extending in a common plane and at an angle to each other, means interconnecting said legs intermediate the extremities thereof comprising a chin bar, said chin bar consisting of a longitudinally extending tubular member having flattened end portions, each of said flattened end portions having a protuberance formed thereon extending at right angles to the flattened end portions, each of said tubular legs having a slot formed therein with the slot of one leg facing the slot of the other leg, said slots being of a width conforming to the thickness of said flattened portions, said slots having an enlarged portion above the bases thereof for receiving the protuberance of a flattened portion of said connecting chin bar, said slots being formed in the walls of said legs with the portions of the inner walls of said legs defining said slots extending at an angle with respect to each other, the distance between said inner walls at said enlarged portions being equal to the distance between said protuberances, the distance between said inner walls below said enlargements being greater than the distance between said protuberances, said chin bar being connected to said legs with said protuberances bearing respectively against the inner walls of said legs below said enlarged portions.

References Cited in the file of this patent
UNITED STATES PATENTS

| | | |
|---|---|---|
| 1,055,522 | Cumming | Mar. 11, 1913 |
| 2,221,934 | Ferris | Nov. 19, 1940 |
| 2,608,240 | Booth | Aug. 26, 1952 |
| 2,710,053 | Hamilton | June 7, 1955 |